Jan. 24, 1933.         E. STURM         1,895,353
ROTARY ENGINE
Filed Jan. 20, 1930
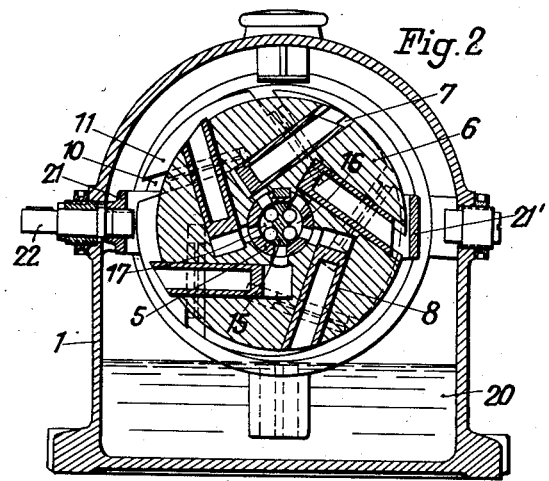
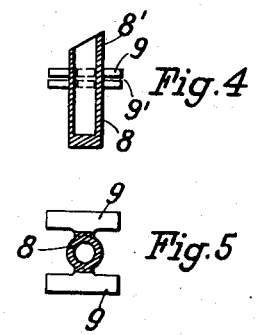
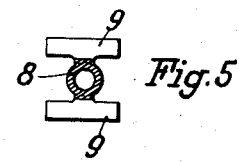
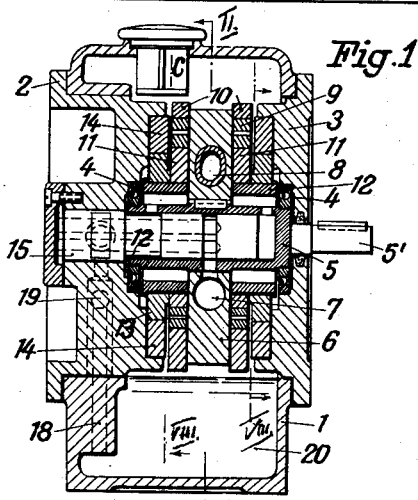
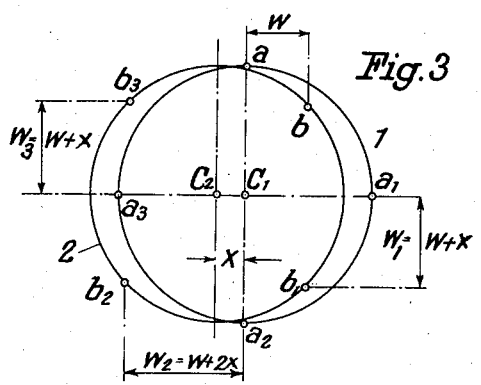
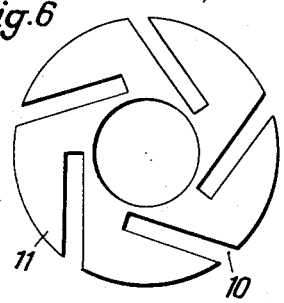
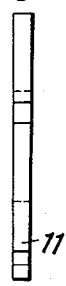
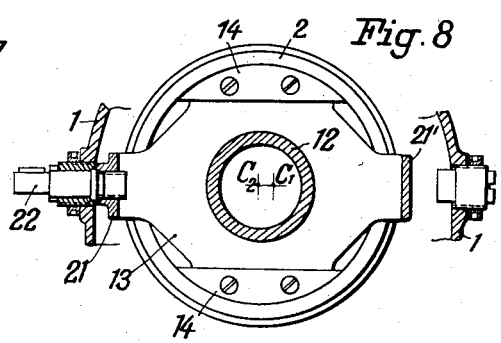
Inventor:

Patented Jan. 24, 1933

1,895,353

UNITED STATES PATENT OFFICE

ERWIN STURM, OF STUTTGART-BOTNANG, GERMANY

ROTARY ENGINE

Application filed January 20, 1930, Serial No. 422,123, and in Germany December 18, 1929.

This invention relates to a rotary engine designed for hydraulic drives, especially adapted as pump or motor in a hydraulic gear with regulation without steps.

In the hydraulic gears of known type either a rotary engine with vane-pistons or with press pistons reciprocating in cylindrical bores has been used hitherto as pump or motor. The first mentioned kind of gear presents the advantage that it is of compact construction and that the produced or active pressure of the driving- or raising-medium acts tangentially to the piston drum. The vane pistons permit however only of the application of pressures of moderate heights of the raising- or driving-medium, as otherwise the hydraulic slip and thereby the losses would become too great. As further driving gears of this kind, when they are equipped for uniform alteration of the transmission, cannot be constructed relieved, high bearing pressures are produced in the same, so that their application is limited to low fluid pressures and to a limited efficiency range.

The other type of driving gear with press-pistons radial to the axis of rotation permits the application of high pressures and, when suitably constructed, also of high speeds. As, however, in all such driving gears the pressure of the driving fluid does not act in the direction of rotation, and only a small component acts as revolving force, the bearing pressures and the slide pressures of the pistons are high. These driving gears have therefore a great no-load work and an insufficient efficiency for great outputs. They require further special devices to take up the high bearing pressures and must consequently be of great dimensions and are expensive to build. Owing to the high cost they are not suitable for small output. The range of application for both these types of driving gear is therefore narrowly limited.

This invention has for its object, to create a rotary engine for hydraulic drives which, used for hydraulic gears, unite the advantages of the two above mentioned kinds of gear, avoiding however the inconveniences of the same.

A gear fitted with the new rotary engine possesses the following properties:

1.—The pressure of the driving fluid acts always in the direction of rotation.
2.—It permits of the application of high pressures.
3.—It works equally well at high and low speeds and in both directions of rotation.
4.—The bearing pressures are low.
5.—The no-load work is little.
6.—The gear is simple and cheap to manufacture, of small size, light and of long life.
7.—It is reliable and easy to attend.

To attain this object, as driving or driven element of the gear a rotary engine with pistons reciprocating in cylindrical bores is used, in which according to the invention the piston movement is produced by the relative movement of two rotatable bodies rotating at the same number of revolutions and arranged eccentrical the one to the other, the one rotating body carrying the cylinders and the other the pistons, the cylinder bores being directed tangential to the direction of rotation of the cylinder body. This cylinder body rotates, in known manner, around a central valve element containing the suction and pressure pipes and the ports. An aggregate is thereby obtained, which is of extraordinarily compact build, and in which the piston forces themselves occur as tangential circumferential forces, whereas for the high bearing surface pressures only the moderate relative speed between the two rotatable bodies has to be taken into account. Specially favorable conditions for a drive by high speed engines are therefore obtained. Owing to the small rotating masses and to the low bearing pressures there is very little no-load work.

A rotary engine constructed according to the invention is illustrated by way of example in the accompanying drawing, said engine adapted to be used as pump or as motor in a hydraulic gear.

Fig. 1 shows a longitudinal section.
Fig. 2 is a cross section on line II—II of Fig. 1.
Fig. 3 shows a diagram of the piston movement of the driving element.

Figs. 4 and 5 show one of the pump pistons with guide pieces partly in section.

Figs. 6 and 7 show one of the piston-carrying discs in front elevation and side view respectively.

Fig. 8 is a section on line VIII—VIII of Fig. 1 showing the adjusting device for altering the flowing quantity of the hydraulic filling medium.

The rotary engine shown in the drawing consists of an outer casing 1 constructed as oil vessel with bores extending from one side to the other closed at both sides by covers 2 and 3 respectively. In the two covers a hollow shaft 5 is journaled by means of ball bearings 4. This shaft 5 carries on the closed side an extension shaft 5′ to which a driving motor is to be attached. On the middle of the hollow shaft 5 a cylinder body 6 is keyed which has a number of bores 7 for pistons 8. The cylinders 7 and the pistons 8 are arranged tangential to the direction of rotation of the cylinder body 6. The pistons 8 have each a lateral guide shoe 9 standing perpendicular to the cylindrical portion of the piston. The guide shoes 9 slide in slots 10 of two discs 11. These slots are perpendicular to the cylinder bores 7, and the discs 11 are arranged at either side of the cylinder body 6 loosely rotatable around sleeves 12. These sleeves 12 are mounted in carriages 13, which are arranged between two segment pieces 14 fixed on the covers 2 and 3, so that the carriages can slide to adjust the center $C_2$ of the sleeves 12 relatively to the center $C_1$ of the hollow shaft 5 to different eccentricity. By the shoes 9 of the pistons sliding in the guides 10 of the piston carriers 11, the latter are positively coupled with the cylinder body 6 so that these two bodies rotate at the same number of revolutions and at the same angular speed.

When the two bodies are rotating, the pistons 8 are reciprocated in the cylinders 7.

In order to obtain low specific surface pressures and thereby favorable friction-and wearing conditions, it is important to utilize all the pistons simultaneously for the transmission. The guides 9 are made resilient by longitudinal slots 9′ so that for the simultaneous utilization of all the pistons not a too accurate division of the cylinder star and of the piston carrier is necessary, whereby the cost of manufacture would be increased, small division errors being thereby compensated for.

To further enlarge the bearing surfaces the pistons have, behind their surface guides, at 8′ an extension of the cylindrical guiding, which at the same time prevents edging of the pistons.

The manner in which the pistons move can be seen from the diagram shown in Fig. 3, in which is supposed that the axis of rotation $C_1$ of the cylinder body 6 is spaced the distance $x$ from the axis of rotation $C_2$ of the piston carriers 11. If $a$ be a point on the cylinder body 1 and $b$ a point on the piston carrier 11; the distance of point $b$ from the radius sector belonging to point $a$ will be equal to $w$ in the position on the top. At rotation through 90° this distance increases to $w+x$, at rotation through 180° the maximum value $w+2x$ is reached. At rotation through 270° the distance decreases to $w+x$, and at rotation through 360° it attains again the minimum value $w$.

If, therefore, the cylinder 7 of the pump, the piston 8 of which is suspended to $b$, is substituted for the point $a$, the half rotation from above to below corresponds to the suction stroke, the other half rotation from below to above corresponding to the pressure stroke. At tangential position of the cylinders to the axis of rotation of the cylinder body the stroke of the pump is equal to double the eccentricity of the axis of rotation of the cylinder body and of the piston carrier, the piston forces being directed tangential to the direction of rotation.

The channels necessary for conducting the raising- or driving fluid are best understood from the description of the course of the liquid flow at the suction- and pressure stroke of the engine. In order to separate the suction side from the pressure side of the engine, an insert piece 15 is arranged in the hollow shaft 5 separating the internal space into a suction space 16 and into a pressure space 17.

When the piston drum 6 is rotating in clockwise direction, the pistons on the right side of the vertical central line move outwards, those on the left moving inwards. The liquid can then be sucked into the suction space 16 from the oil collecting space 20 through a channel 18, in which a check valve 19 is built, and flow thence through ports in the hollow shaft 5 to in front of the pistons carrying out their suction stroke. At the pressure stroke, however, the liquid standing in front of the piston is pressed into the pressure space 17, whence the compressed liquid is conducted into another hydraulic engine or to in front of the pistons of an hydraulic engine constructed in a similar manner, in which the pressure rotates the piston drum of the engine, whereupon the expanded liquid is returned into the oil collecting space 20.

In order to alter the capacity of the pump or to alter in uniform succession the reception capability of the motor, it is merely necessary to make adjustable the carriages 13 carrying the piston carriers so that the eccentricity of piston carrier 11 and cylinder body 6 can be adjusted up to zero or at the reversing of the direction of rotation to the opposite direction. With this object in view the carriages 13 are connected the one with the other at one end by a bow 21, on which an adjusting spindle 22 rotatably mounted on the casing acts, which may be turned by a hand wheel not shown. The adjusting might however be effected in any other suitable manner.

I claim:

1. An engine adapted to be employed as liquid pump or as liquid motor having pistons reciprocatable in cylindrical bores arranged tangentially to the direction of rotation, the movement of said pistons being effected by the relative movement of two mutually eccentric elements, one of said elements carrying the cylinder and the other the piston, comprising in combination with the pistons and the cylinder body two discs forming the piston carriers provided with slots serving as guides, and shoes on two opposite sides in the middle portion of said piston adapted to engage in the slots in said discs and positively connecting said cylinder body to said piston carriers so that a relative movement of the parts can only take place when they are rotating at the same speed.

2. An engine as specified in claim 1, in which the shoes of the pistons are provided with a longitudinal slot to ensure by resultant resiliency a simultaneous bearing of all piston guides even when no pitch errors exist between the cylinder body and the piston carriers.

In testimony whereof I affix my signature.

ERWIN STURM.